United States Patent
Horikawa

(10) Patent No.: US 8,813,894 B1
(45) Date of Patent: Aug. 26, 2014

(54) MOTORCYCLE

(71) Applicant: Yamaha Hatsudoki Kabushiki Kaisha, Iwata (JP)

(72) Inventor: Makoto Horikawa, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 0 days.

(21) Appl. No.: 14/018,547

(22) Filed: Sep. 5, 2013

(30) Foreign Application Priority Data

Mar. 26, 2013 (JP) ................. 2013-065052

(51) Int. Cl.
B62K 11/04 (2006.01)
B62K 25/04 (2006.01)

(52) U.S. Cl.
CPC ...................... *B26K 11/04* (2013.01)
USPC ......................................... 180/227

(58) Field of Classification Search
CPC ................. B62K 25/283; B62K 25/286
USPC ................................. 180/219, 227
See application file for complete search history.

(56) References Cited

U.S. PATENT DOCUMENTS 6,290,017 B1 9/2001 Ito
2011/0079458 A1 4/2011 Nishiyama et al.

FOREIGN PATENT DOCUMENTS

| JP | 63-227482 A | 9/1988 |
| JP | 63-275493 A | 11/1988 |
| JP | 2000-085670 A | 3/2000 |
| JP | 2003-127965 A | 5/2003 |
| JP | 2011-079343 A | 4/2011 |

OTHER PUBLICATIONS

Official Communication issued in corresponding European Patent Application No. 13185696.5, mailed on Dec. 6, 2013.

*Primary Examiner* — Joseph M Rocca
*Assistant Examiner* — Gabriela C Craciun
(74) *Attorney, Agent, or Firm* — Keating & Bennett, LLP

(57) ABSTRACT

A motorcycle includes a body frame including right and left main frames and right and left rear arms, a rear suspension disposed on a vehicle center line so that its axis extends substantially in a fore-and-aft direction, and a seat located above the rear suspension. The left main frame includes a left inclined portion extending obliquely rightward and rearward, and a left minimum portion. The right main frame includes a right inclined portion extending obliquely leftward and rearward, and a right minimum portion located rightward of the left minimum portion such that a distance between the right and left main frames in a vehicle width direction is at a minimum rearward of the left inclined portion and the right inclined portion. The rear suspension is at least partially located between the right and left minimum portions in a plan view of the motorcycle.

15 Claims, 7 Drawing Sheets

MOTORCYCLE

This application claims priority to Patent Application No. 2013-65052 filed in Japan on Mar. 26, 2013, the entire contents of which are hereby incorporated by reference.

BACKGROUND OF THE INVENTION

1. Field of the Invention

The present invention relates to motorcycles.

2. Description of the Related Art

In a motorcycle, front and rear suspensions are conventionally provided in front and rear portions of a vehicle body, respectively, in order to absorb an impact from the ground and stabilize the vehicle body. The rear suspension is located below a seat of the motorcycle, and is often disposed substantially perpendicularly with respect to the ground. Therefore, a position of the seat is unfortunately raised by a height of the rear suspension. Since a space located below the rear suspension cannot be utilized efficiently, an exhaust system component such as a silencer is disposed laterally of the motorcycle, which disadvantageously degrades an agile appearance of the vehicle body.

In a motorcycle it is desired that from the viewpoint of providing favorable contact between a rider's foot and the ground and enhancing vehicle operability, a seat position should be lowered and a seat width in a vehicle width direction (hereinafter referred to as a "seat lateral width") should be reduced. To achieve this result, a method for lowering a seat position is disclosed in JP-A-2000-85670, JP-A-2003-127965, and JP-A-2011-79343, for example. In the disclosed method, a rear suspension through which a cross member extending between a pair of right and left main frames and rear arms are connected to each other is disposed substantially horizontally with respect to the ground. When a rear suspension located below a seat is disposed substantially horizontally with respect to the ground, a height of the rear suspension can be lowered and thus a seat position can be lowered as compared with a case where a rear suspension is disposed substantially perpendicularly. Besides, when a rear suspension is disposed substantially horizontally, a space located below the rear suspension can be utilized efficiently.

A seat lateral width is decided depending on a shape of each main frame disposed below the seat. Hence, in order to reduce a seat lateral width, a distance between portions of a pair of right and left main frames located below the seat has to be reduced in a vehicle width direction. However, in the technique disclosed in JP-A-2000-85670, the pair of right and left main frames are connected to each other at positions located outward of the rear arms, and therefore, a distance between the main frames in a vehicle width direction cannot be smaller than a distance between the rear arms in the vehicle width direction. In the technique disclosed in JP-A-2003-127965, the rear suspension is offset toward the right one of the pair of main frames, and not only the rear suspension but also an exhaust pipe is arranged in the vehicle width direction. Therefore, the distance between the main frames in the vehicle width direction cannot be reduced, and in addition, a torsional load is unfortunately applied to the cross member. In the technique disclosed in JP-A-2011-79343, the rear suspension is offset toward the right one of the pair of main frames, and not only the rear suspension but also a component such as a battery is arranged in the vehicle width direction. Therefore, the distance between the main frames in the vehicle width direction cannot be reduced, and in addition, a torsional load is unfortunately applied to the cross member.

SUMMARY OF THE INVENTION

Accordingly, preferred embodiments of the present invention provide a motorcycle that provides favorable contact between a rider's foot and the ground and enhances vehicle operability by lowering a seat position and reducing a seat lateral width.

A motorcycle according to a preferred embodiment of the present invention includes a head pipe; a body frame including a left main frame that extends obliquely downward and rearward from the head pipe, a right main frame that extends obliquely downward and rearward from the head pipe and is located rightward of the left main frame, a left rear arm connected to the left main frame, a right rear arm connected to the right main frame, and a cross member that extends between the left main frame and the right main frame; an engine disposed below the left main frame and the right main frame; a rear suspension disposed on a vehicle center line so that an axis of the rear suspension extends substantially in a fore-and-aft direction and through which the cross member and the right and left rear arms are connected to each other; and a seat supported by the body frame and at least partially located above the rear suspension. The left main frame includes a left connecting portion disposed between the left rear arm and the right rear arm and connected to the left rear arm, a left inclined portion located rearward of the cross member and extended obliquely rightward and rearward, and a left minimum portion which is located rearward of the left inclined portion. The right main frame includes a right connecting portion disposed between the left rear arm and the right rear arm and connected to the right rear arm, a right inclined portion located rearward of the cross member and extended obliquely leftward and rearward, and a right minimum portion located rearward of the right inclined portion and rightward of the left minimum portion such that a distance between the left main frame and the right main frame in a vehicle width direction is at a minimum rearward of the left inclined portion and the right inclined portion. The rear suspension is at least partially disposed between the left minimum portion and the right minimum portion in a plan view of the motorcycle.

In the motorcycle according to a preferred embodiment of the present invention, the rear suspension is disposed so that its axis does not extend in a vertical direction but extends substantially in the fore-and-aft direction. Therefore, a vertical height of the rear suspension is reduced, and an increase in a vertical dimension of the motorcycle can be prevented. Thus, a height of the seat located above the rear suspension can be reduced. Furthermore, the left connecting portion of the left main frame and the right connecting portion of the right main frame are disposed between the left rear arm and the right rear arm. The left main frame is connected to the left rear arm from a position rightward of the left rear arm, and the right main frame is connected to the right rear arm from a position leftward of the right rear arm. Hence, a distance between the left connecting portion of the left main frame and the right connecting portion of the right main frame in the vehicle width direction is smaller than a distance between the left rear arm and the right rear arm in the vehicle width direction. The left main frame includes the left minimum portion. The right main frame includes the right minimum portion which is located rightward of the left minimum portion such that the distance between the right main frame and the left main frame in the vehicle width direction is at a minimum rearward of the left inclined portion and the right inclined portion. The rear suspension is at least partially disposed between the left minimum portion and the right minimum, portion. Therefore, the seat located above the rear suspension can have a reduced lateral width at the portion of the seat located above the left minimum portion and the right minimum portion. Accordingly, the motorcycle according to a preferred embodiment of the present invention provides a favorable contact between a rider's foot and the ground and effective utilization of the space below the rear suspension, and also enhances vehicle operability. Since the rear suspension is disposed on the vehicle center line, a torsional force is prevented from being exerted on the rear suspension itself. Consequently, the rear suspension is operated smoothly. Besides, since the rear suspension is disposed on the vehicle center line, no torsional load is applied to the cross member. As a result, the motorcycle according to a preferred embodiment of the present invention enhances vehicle stability.

According to a preferred embodiment of the present invention, the motorcycle preferably further includes a link member interposed between the rear suspension and the right and left rear arms.

Thus, the rear suspension and the right and left rear arms are connected to each other with stability.

According to a preferred embodiment of the present invention, the link member preferably includes lower connection portions connected to the left rear arm and the right rear arm, and an upper connection portion located above the lower connection portions in a side view of the motorcycle and connected to the rear suspension.

Since the link member is interposed between the rear suspension and the right and left rear arms, the connected portion of the rear suspension is located above the connected portions of the right and left rear arms in the side view. By providing the link member in this manner, the connected portion of the rear suspension is disposed at a higher position. Hence, an angle of the axis of the rear suspension with respect to a horizontal line can be further reduced.

According to a preferred embodiment of the present invention, the link member preferably includes a main body that is arc-shaped in the side view, a left connection portion through which the main body and the left rear arm are connected to each other, and a right connection portion through which the main body and the right rear arm are connected to each other. The main body preferably includes a left front end portion connected to the left main frame in a swingable manner, a right front end portion connected to the right main frame in a swingable manner, and a rear end portion connected to the rear suspension in a swingable manner.

Thus, it is possible to absorb an impact on the motorcycle from the ground more favorably while using the rear suspension disposed so that its axis extends substantially in the fore-and-aft direction.

According to a preferred embodiment of the present invention, the left minimum portion and the right minimum portion are preferably located rearward of the left connecting portion and the right connecting portion, respectively.

Thus, the seat located above the rear suspension can have a reduced lateral width at the portion of the seat located rearward of the left connecting portion and the right connecting portion.

According to a preferred embodiment of the present invention, the left minimum portion and the right minimum portion are preferably located forward of a rear end portion of the left main frame and a rear end portion of the right main frame, respectively, and rearward of a front end portion of the left rear arm and a front end portion of the right rear arm, respectively.

Thus, the seat located above the rear suspension can have a reduced lateral width at the portion of the seat located forward of the rear end portion of the left main frame and the rear end portion of the right main frame, and rearward of the front end portion of the left rear arm and the front end portion of the right rear arm.

According to a preferred embodiment of the present invention, a sum of a distance between the left connecting portion and the rear suspension in the vehicle width direction and a distance between the right connecting portion and the rear suspension in the vehicle width direction is preferably shorter than a width of the rear suspension in the vehicle width direction.

Thus, the distance between the left connecting portion and the rear suspension and the distance between the right connecting portion and the rear suspension are each small, and therefore, the seat located above the rear suspension can have a reduced lateral width at the portion of the seat located above the left connecting portion and the right connecting portion. The distance between the left minimum portion and the right minimum portion in the vehicle width direction is smaller than the distance between the left connecting portion and the right connecting portion in the vehicle width direction. Hence, the seat located above the rear suspension can have a further reduced lateral width at the portion of the seat located above the left minimum portion and the right minimum portion.

According to a preferred embodiment of the present invention, an upper end of the rear suspension is preferably located lower than an upper end of the engine, and a lower end of the rear suspension is preferably located higher than a lower end of the engine.

Thus, an increase in the vertical dimension of the motorcycle can be prevented.

According to a preferred embodiment of the present invention, the motorcycle preferably further includes an exhaust pipe connected to the engine and at least partially extended rearward, and a silencer connected to a rear end portion of the exhaust pipe. The silencer is preferably located lower than the rear suspension.

Thus, a silencer having a sufficient volume can be disposed in a space that is provided below the rear suspension by disposing the rear suspension substantially horizontally. Since no silencer is disposed outward of a rear wheel of the motorcycle, a body of the motorcycle can be reduced in weight and designed to provide an agile appearance (slim appearance).

According to a preferred embodiment of the present invention, the motorcycle preferably further includes a rear wheel supported by a rear end portion of the left rear arm and a rear end portion of the right rear arm. The rear suspension is preferably located lower than a straight line extending between an upper end of the head pipe and a center of the rear wheel in the side view.

Thus, the rear suspension is disposed at a relatively low position on the motorcycle. Therefore, even if the vertical height of the rear suspension is increased, the position of the seat is prevented from being raised. Hence, an increase in the vertical dimension of the motorcycle is prevented.

According to a preferred embodiment of the present invention, the motorcycle preferably further includes a rear wheel supported by a rear end portion of the left rear arm and a rear end portion of the right rear arm, and a power transmission member connected to the engine and the rear wheel and through which a driving force generated by the engine is transmitted to the rear wheel. Either the left rear arm or the right rear arm is preferably provided with a through hole. The power transmission member preferably includes a first portion located below the rear suspension and outward of the rear arm provided with the through hole, a second portion located inside the through hole, and a third portion located inward of the rear arm provided with the through hole.

Thus, the power transmission member is partially disposed inside the through hole provided in the rear arm, thus making it possible to prevent interference between the rear arm and the power transmission member. The left rear arm is connected to the left main frame from a position leftward of the left main frame. A front portion of the left rear arm is located leftward of the left main frame. For example, when the left rear arm is provided with the through hole, the second portion of the power transmission member is located inside the through hole of the left rear arm. Therefore, in that case, interference between the left rear arm and the power transmission member can be prevented even if the front portion of the left rear arm is located relatively leftward.

According to a preferred embodiment of the present invention, the motorcycle preferably further includes a foot rest on which a rider's foot is placed, the foot rest being disposed below the seat and rearward of a front end of the rear suspension in the side view. The left minimum portion and the right minimum portion are preferably located between the front end of the rear suspension and the foot rest in the side view.

Thus, the seat can have a reduced lateral width at the portion of the seat located rearward of the front end of the rear suspension and forward of the foot rest in the side view. The rider can place his or her leg at a position laterally of the portion of the seat whose lateral width is small. As a result, more favorable contact is provided between the rider's foot and the ground.

According to a preferred embodiment of the present invention, the motorcycle preferably further includes a battery disposed below the seat and above the rear suspension.

Since the vertical height of the rear suspension is reduced and an increase in the vertical dimension of the motorcycle is prevented, the battery can be disposed below the seat and above the rear suspension in a compact manner.

According to a preferred embodiment of the present invention, the motorcycle preferably further includes a hydraulic oil pipe disposed outward of either the left minimum portion or the right minimum portion.

Thus, a space provided outward of the left minimum portion or the right minimum portion is utilized, thus making it possible to dispose the hydraulic oil pipe in a compact manner. Since the hydraulic oil pipe does not protrude outward in the vehicle width direction, the motorcycle is reduced in lateral width.

According to a preferred embodiment of the present invention, the motorcycle preferably further includes a left seat frame that extends obliquely upward and rearward from the left main frame, and a right seat frame that extends obliquely upward and rearward from the right main frame. The left main frame preferably includes a left connection portion connected to the left seat frame. The right main frame preferably includes a right connection portion connected to the right seat frame. The left main frame and the left rear arm are preferably configured so that in a left side view of the motorcycle, the left connection portion is disposed on or below a straight line extending between an upper end of the left main frame and an upper end of the left rear arm, and/or the right main frame and the right rear arm are preferably configured so that in a right side view of the motorcycle, the right connection portion is disposed on or below a straight line extending between an upper end of the right main frame and an upper end of the right rear arm.

Since the left connection portion is disposed on or below the straight line extending between the upper end of the left main frame and the upper end of the left rear arm, the left connection portion connected to the left seat frame can be set at a low height. Furthermore, since the right connection portion is disposed on or below the straight line extending between the upper end of the right main frame and the upper end of the right rear arm, the right connection portion connected to the right seat frame can be set at a low height. As a result, the seat is set at a low height.

As described above, various preferred embodiments of the present invention provide a motorcycle that provides a favorable contact between a rider's foot and the ground and enhances vehicle operability by lowering a seat position and reducing a seat lateral width.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
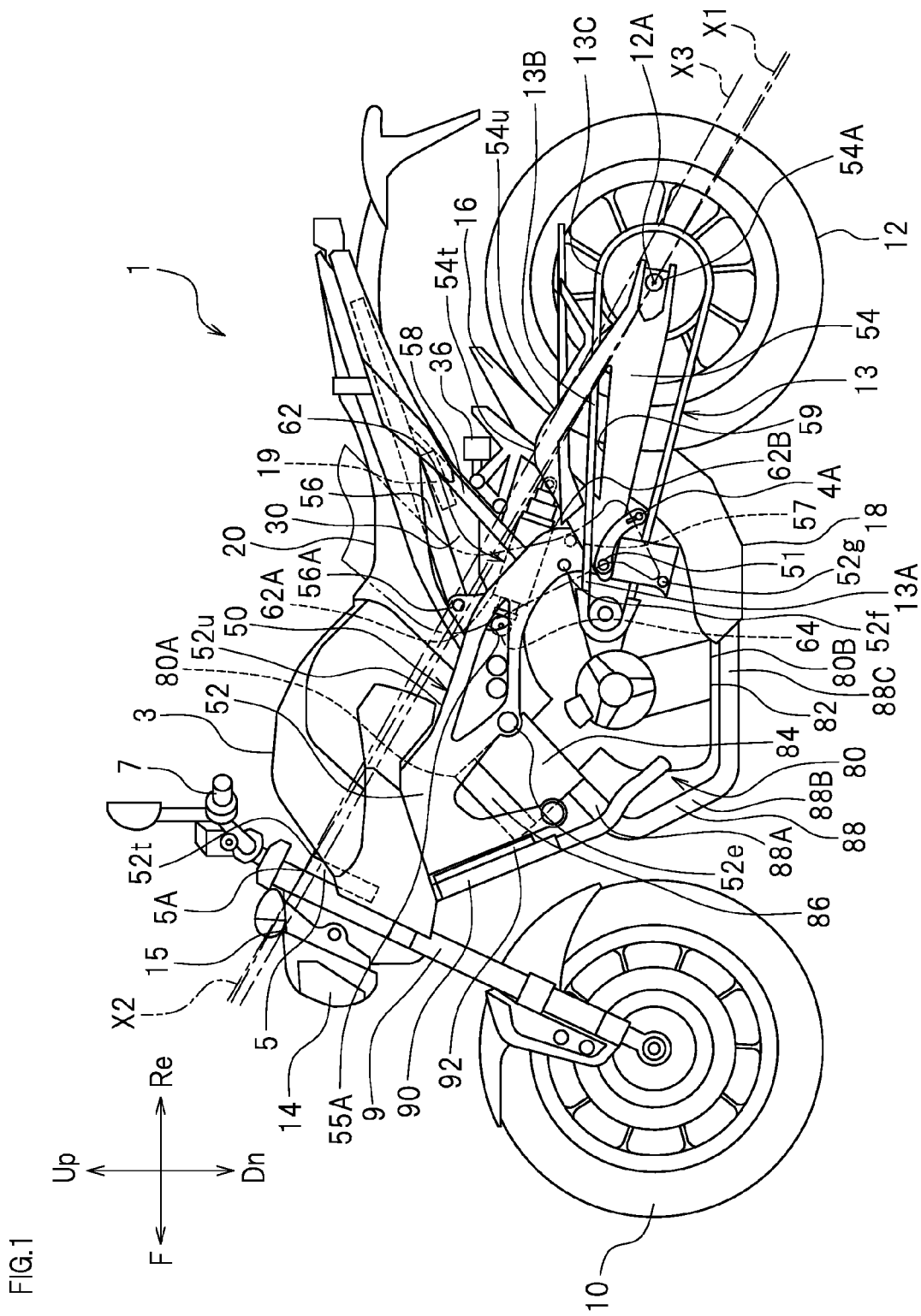
FIG. 1 is a left side view illustrating a motorcycle according to a preferred embodiment of the present invention.

Hereinafter, preferred embodiments of the present invention will be described. As illustrated in FIG. 1, a motorcycle (vehicle) according to the present preferred embodiment is preferably a "street type" motorcycle 1, for example. Note that the motorcycle according to the preferred embodiments of the present invention is not limited to the "street type" motorcycle 1. The motorcycle according to the preferred embodiments of the present invention may be any other type of motorcycle such as a "moped type", "off-road type" or "scooter type" motorcycle, for example.

In the following description, "front", "rear", "right" and "left" indicate front, rear, right and left with respect to a rider of the motorcycle 1, respectively. Reference signs "F", "Re", "R" and "L" used in the drawings represent front, rear, right and left, respectively. Furthermore, "up" and "down" indicate an upward direction and a downward direction when the motorcycle 1 is brought to a stop on a horizontal plane, respectively. Reference signs "Up" and "Dn" used in the drawings represent "vertically upward" and "vertically downward", respectively.

Figure 2:
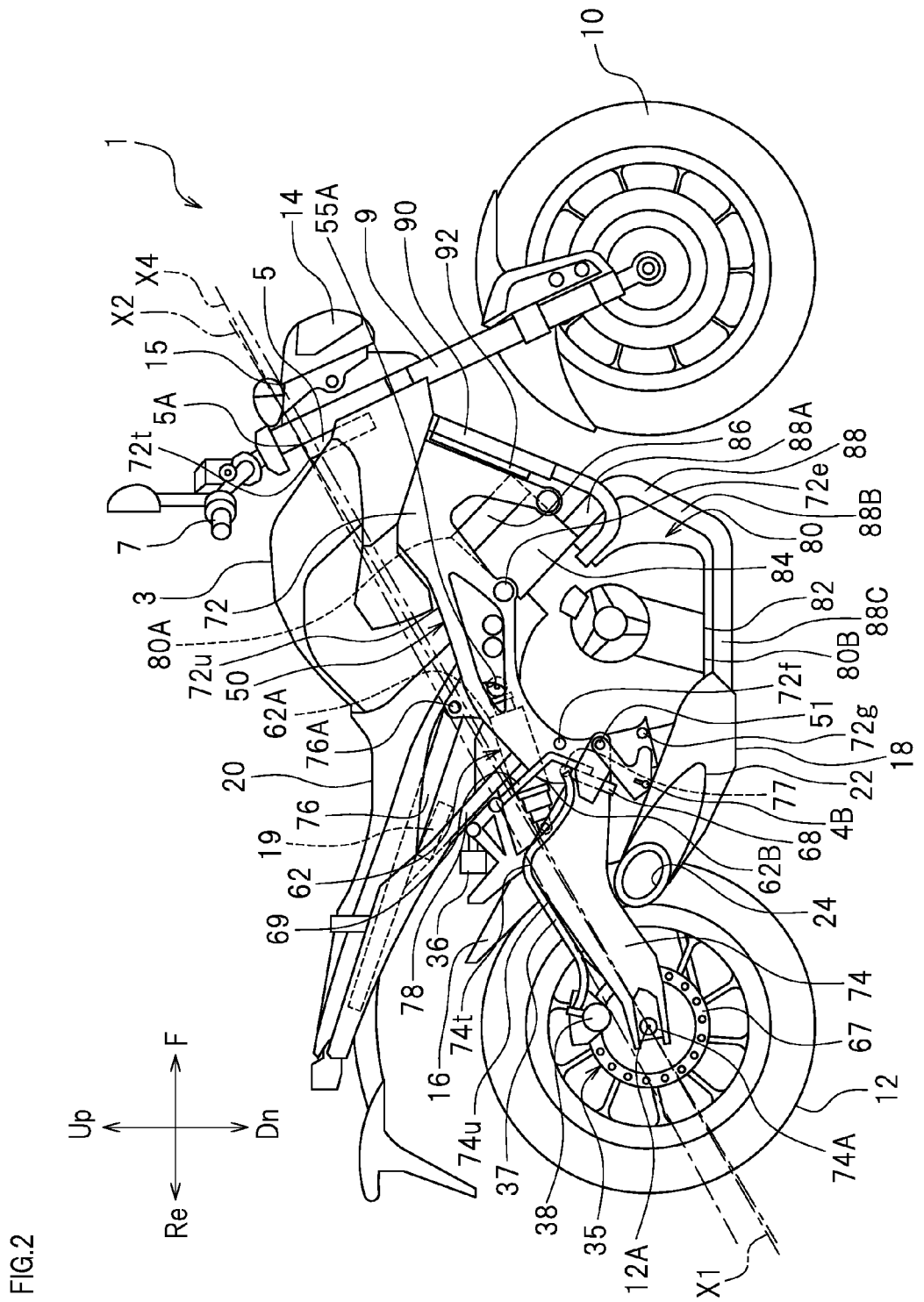
FIG. 2 is a right side view illustrating the motorcycle according to a preferred embodiment of the present invention.

As illustrated in FIGS. 1 and 2, the motorcycle 1 preferably includes a fuel tank 3, a seat 20, an engine 80 that is preferably an internal combustion engine, and a body frame 50 that supports these components. A head pipe 5 is provided forward of the body frame 50. A headlight 14 is disposed forward of the head pipe 5. The head pipe 5 supports a steering shaft (not illustrated). A handlebar 7 is provided at an upper portion of the steering shaft. A front fork 9 is provided at a lower portion of the steering shaft. A front wheel 10 is rotatably supported by a lower end portion of the front fork 9.

Figure 4:
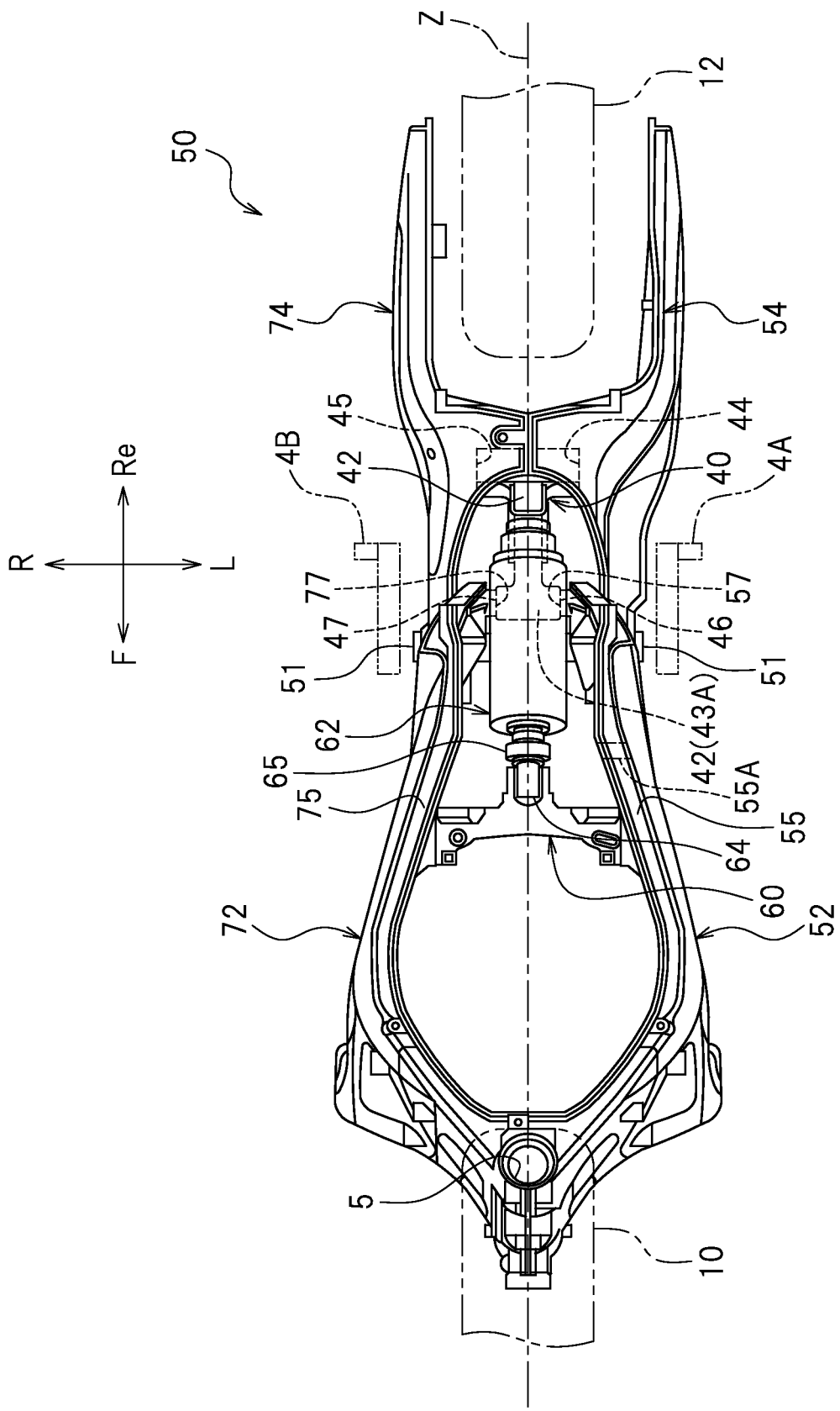
FIG. 4 is a plan view illustrating the body frame according to a preferred embodiment of the present invention.

As illustrated in FIG. 4, the body frame 50 preferably includes a left main frame 52, a right main frame 72, a left rear arm 54, a right rear arm 74, and a cross member 60. As illustrated in FIG. 1, the left main frame 52 extends obliquely downward and rearward from the head pipe 5. As illustrated in FIG. 2, the right main frame 72 extends obliquely downward and rearward from the head pipe 5 and is located rightward of the left main frame 52. As illustrated in FIG. 4, the left rear arm 54 is connected to the left main frame 52. The right rear arm 74 is connected to the right main frame 72. The cross member 60 extends between the left main frame 52 and the right main frame 72. The left main frame 52 and the right main frame 72 are preferably molded of aluminum, for example.

As illustrated in FIG. 1, the body frame 50 preferably further includes a left seat frame 56 that extends obliquely upward and rearward from a position somewhere along the left main frame 52, and a left back stay 58 that extends obliquely upward and rearward from the left main frame 52 at a position located rearward of the left seat frame 56. The left main frame 52 preferably includes a left connection portion 56A connected to the left seat frame 56. The left seat frame 56 and the left back stay 58 are connected to each other at a position located rearward of the left main frame 52. As illustrated in FIG. 2, the body frame 50 preferably further includes a right seat frame 76 that extends obliquely upward and rearward from a position somewhere along the right main frame 72, and a right back stay 78 that extends obliquely upward and rearward from the right main frame 72 at a position located rearward of the right seat frame 76. The right main frame 72 preferably includes a right connection portion 76A connected to the right seat frame 76. The right seat frame 76 and the right back stay 78 are connected to each other at a position located rearward of the right main frame 72. The seat 20 is supported by the left seat frame 56 and the right seat frame 76 of the body frame 50. At least a portion of the seat 20 is located above a rear suspension 62 which will be described below. The left seat frame 56 and the right seat frame 76 each preferably have a pipe shape.

A rear wheel 12 is rotatably supported by a rear end portion 54A of the left rear arm 54 and a rear end portion 74A of the right rear arm 74. A rear fender 16 is disposed above a portion of the rear wheel 12. The rear fender 16 is supported by the left rear arm 54 and the right rear arm 74.

As illustrated in FIG. 1, the left main frame 52 and the left rear arm 54 are configured so that in a left side view of the motorcycle 1, an upper edge 52u of the left main frame 52, the left connection portion 56A, and an upper edge 54u of the left rear arm 54 are arranged along a straight line X1 extending between an upper end 15 of the headlight 14 and a center 12A of the rear wheel 12. As illustrated in FIG. 2, the right main frame 72 and the right rear arm 74 are configured so that in a right side view of the motorcycle 1, an upper edge 72u of the right main frame 72, the right connection portion 76A, and an upper edge 74u of the right rear arm 74 are arranged along the straight line X1 extending between the upper end 15 of the headlight 14 and the center 12A of the rear wheel 12.

As illustrated in FIG. 1, the left main frame 52 and the left rear arm 54 are configured so that in the left side view, the left connection portion 56A is disposed lower than a straight line X3 extending between an upper end 52t of the left main frame 52 and an upper end 54t of the left rear arm 54. Alternatively, the left main frame 52 and the left rear arm 54 may be configured so that the left connection portion 56A is disposed on the straight line X3. As illustrated in FIG. 2, the right main frame 72 and the right rear arm 74 are configured so that in the right side view, the right connection portion 76A is disposed lower than a straight line X4 extending between an upper end 72t of the right main frame 72 and an upper end 74t of the right rear arm 74. Alternatively, the right main frame 72 and the right rear arm 74 may be configured so that the right connection portion 76A is disposed on the straight line X4.

As illustrated in FIG. 1, the engine 80 is disposed below the left main frame 52 and the right main frame 72 (see FIG. 2). The engine 80 preferably includes a crankcase 82, a cylinder block 84 that extends obliquely upward and forward from the crankcase 82, a cylinder head 86 connected to an upper portion of the cylinder block 84, and a cylinder head cover (not illustrated) connected to an upper portion of the cylinder head 86. The engine 80 is supported by the left main frame 52 and the right main frame 72 so as not to be swingable. Specifically, the left main frame 52 preferably includes a first left connection portion 52e, a second left connection portion 52f located rearward of the first left connection portion 52e, and a third left connection portion 52g located lower than the second left connection portion 52f. The left main frame 52 and the cylinder block 84 are connected to each other through the first left connection portion 52e. The left main frame 52 and the crankcase 82 are connected to each other through the second left connection portion 52f and the third left connection portion 52g. As illustrated in FIG. 2, the right main frame 72 preferably includes a first right connection portion 72e, a second right connection portion 72f located rearward of the first right connection portion 72e, and a third right connection portion 72g located lower than the second right connection portion 72f. The right main frame 72 and the cylinder block 84 are connected to each other through the first right connection portion 72e. The right main frame 72 and the crankcase 82 are connected to each other through the second right connection portion 72f and the third right connection portion 72g.

As illustrated in FIGS. 1 and 2, a radiator 90 is disposed forward of the engine 80. A radiator fan 92 is disposed between the engine 80 and the radiator 90. The radiator fan 92 allows air to pass through the radiator 90 from a region forward of the radiator 90 in a forced manner.

As illustrated in FIGS. 1 and 2, an exhaust pipe 88 is connected to the cylinder block 84. The exhaust pipe 88 extends rearward. More specifically, the exhaust pipe 88 preferably includes a first portion 88A that extends obliquely downward and forward from the cylinder block 84, a second portion 88B that extends obliquely downward and rearward from the first portion 88A, and a third portion 88C that extends rearward from the second portion 88B. A silencer 18 is connected to a rear end portion of the exhaust pipe 88. The silencer 18 extends obliquely upward and rearward. As illustrated in FIG. 2, a cover 22 including an exhaust port 24 is attached to a rear portion of the silencer 18. The silencer 18 is located lower than the rear suspension 62.

As illustrated in FIG. 1, a housing box 30 is disposed below the seat 20. The housing box 30 is supported by the left seat frame 56 and the right seat frame 76. A battery 19 is disposed in the housing box 30. The battery 19 is disposed below the seat 20 and above the rear suspension 62.

As illustrated in FIG. 4, the left main frame 52 preferably includes a left connecting portion 53 (see FIG. 5), a left inclined portion 55, and a left minimum portion 57. The left minimum portion 57 is located rearward of the left inclined portion 55. The left connecting portion 53 is located rearward of the left inclined portion 55. As illustrated in FIG. 6, the left connecting portion 53 is disposed between the left rear arm 54 and the right rear arm 74. Through the left connecting portion 53, the left main frame 52 and the left rear arm 54 are connected to each other via a pivot shaft 51. The left rear arm 54 is supported by the left main frame 52 via the pivot shaft 51 so as to be swingable. As illustrated in FIG. 4, the left inclined portion 55 is at least partially located rearward of the cross member 60. The left inclined portion 55 extends obliquely rightward and rearward. A distance between the left main frame 52 and the right main frame 72 in a vehicle width direction is at a minimum in a region between the left minimum portion 57 and a right minimum portion 77 rearward of the left inclined portion 55 and the right inclined portion 75, which will be described below. The left inclined portion 55 of the left main frame 52 is provided with a through hole 55A.

As illustrated in FIG. 4, the right main frame 72 preferably includes a right connecting portion 73 (see FIG. 5), a right inclined portion 75, and the right minimum portion 77. The right minimum portion 77 is located rearward of the right inclined portion 75. The right connecting portion 73 is located rearward of the right inclined portion 75. As illustrated in FIG. 6, the right connecting portion 73 is disposed between the left rear arm 54 and the right rear arm 74. Through the right connecting portion 73, the right main frame 72 and the right rear arm 74 are connected to each other via the pivot shaft 51. The right rear arm 74 is supported by the right main frame 72 via the pivot shaft 51 so as to be swingable. As illustrated in FIG. 4, the right inclined portion 75 is at least partially located rearward of the cross member 60. The right inclined portion 75 extends obliquely leftward and rearward. The right inclined portion 75 is located rightward of the left inclined portion 55. The right minimum portion 77 is located rightward of the left minimum portion 57.

Figure 5:
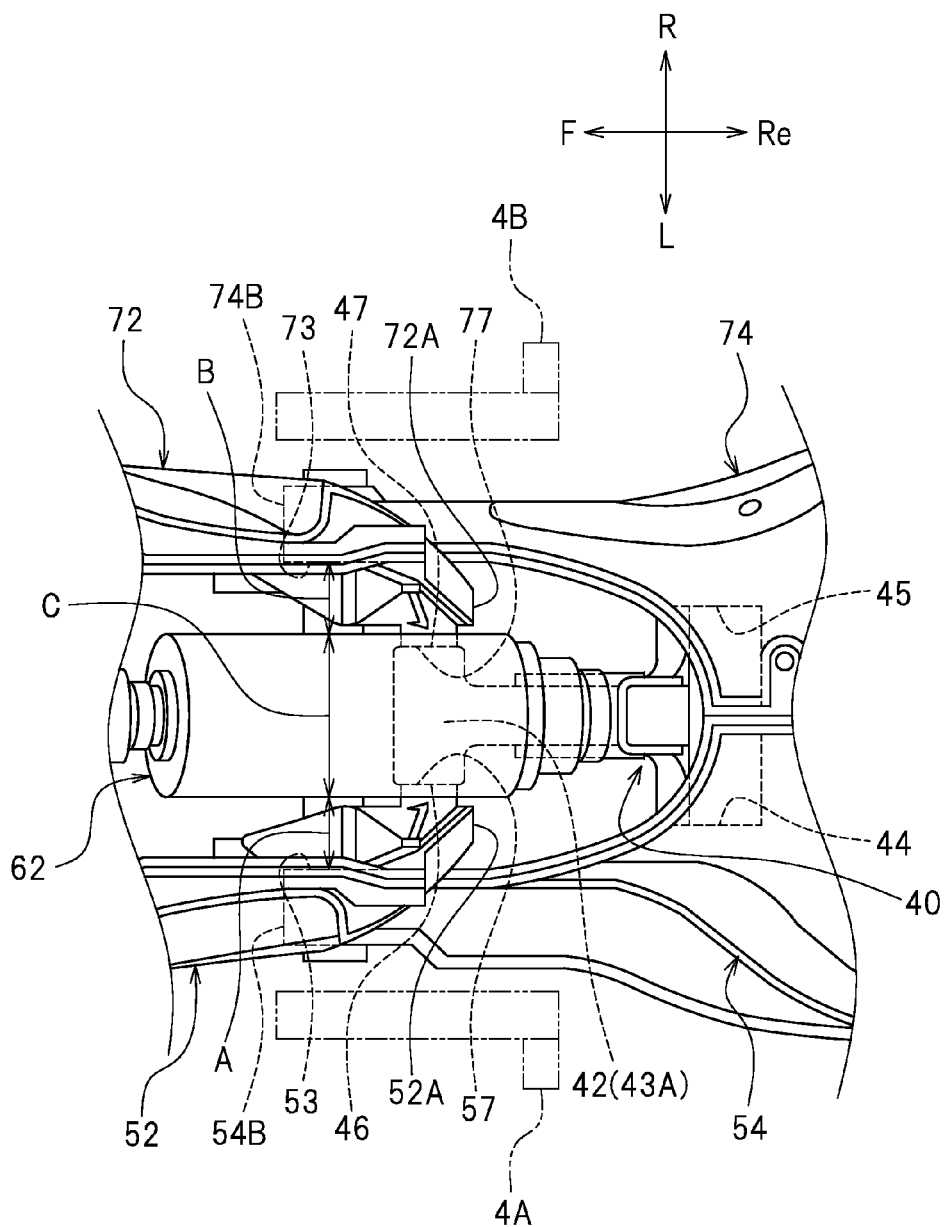
FIG. 5 is an enlarged plan view partially illustrating the body frame according to a preferred embodiment of the present invention.
Figure 6:
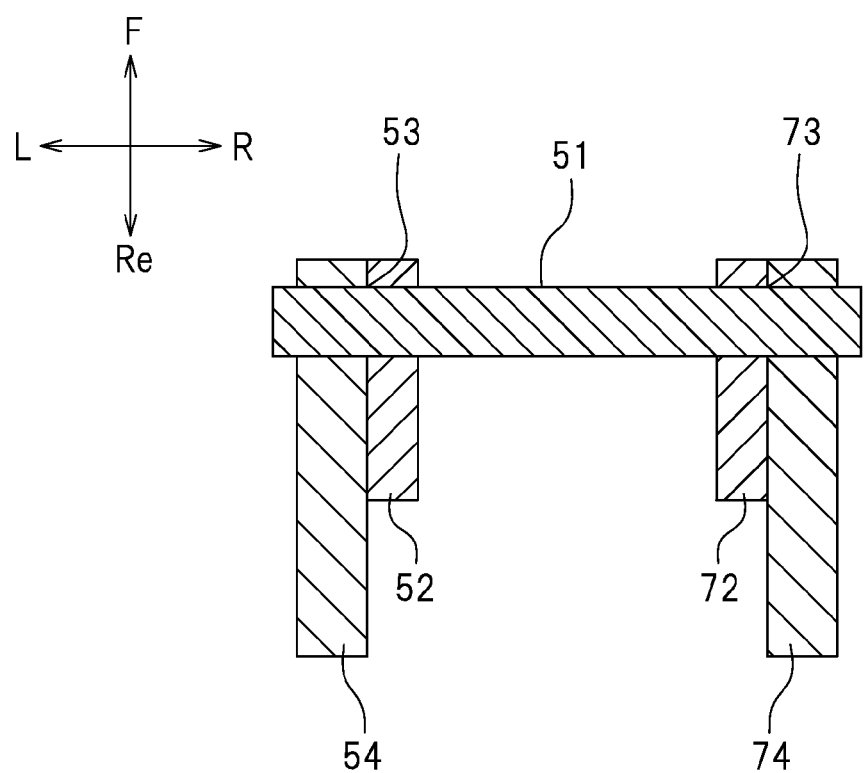
FIG. 6 is a cross-sectional view taken along the line VI-VI of FIG. 3.

As illustrated in FIG. 5, the left minimum portion 57 and the right minimum portion 77 are located rearward of the left connecting portion 53 and the right connecting portion 73, respectively. The left minimum portion 57 and the right minimum portion 77 are located forward of a rear end portion 52A of the left main frame 52 and a rear end portion 72A of the right main frame 72, respectively. The left minimum portion 57 and the right minimum portion 77 are located rearward of a front end portion 54B of the left rear arm 54 and a front end portion 74B of the right rear arm 74, respectively.

Figure 3:
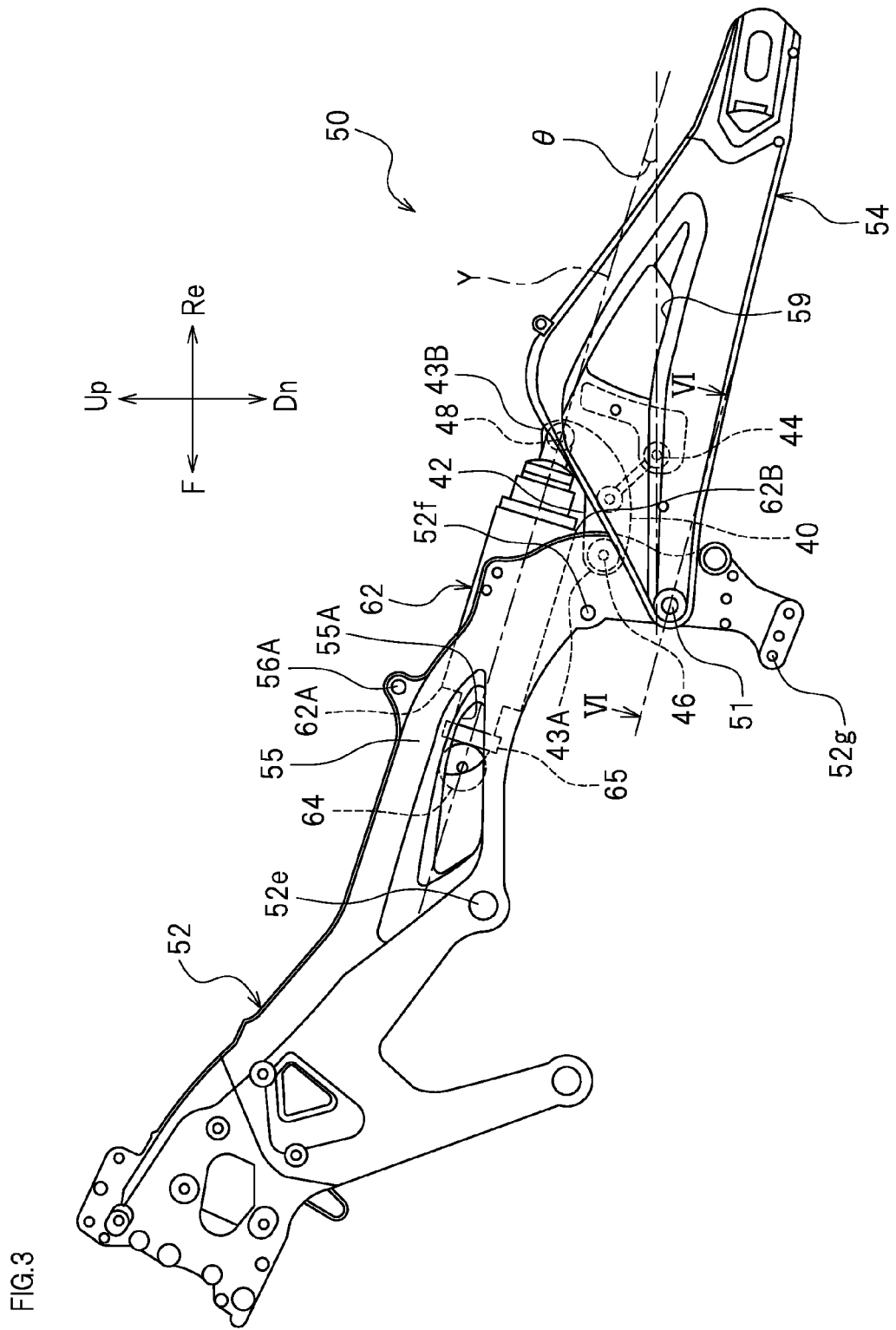
FIG. 3 is a left side view illustrating a body frame according to a preferred embodiment of the present invention.
Figure 7:
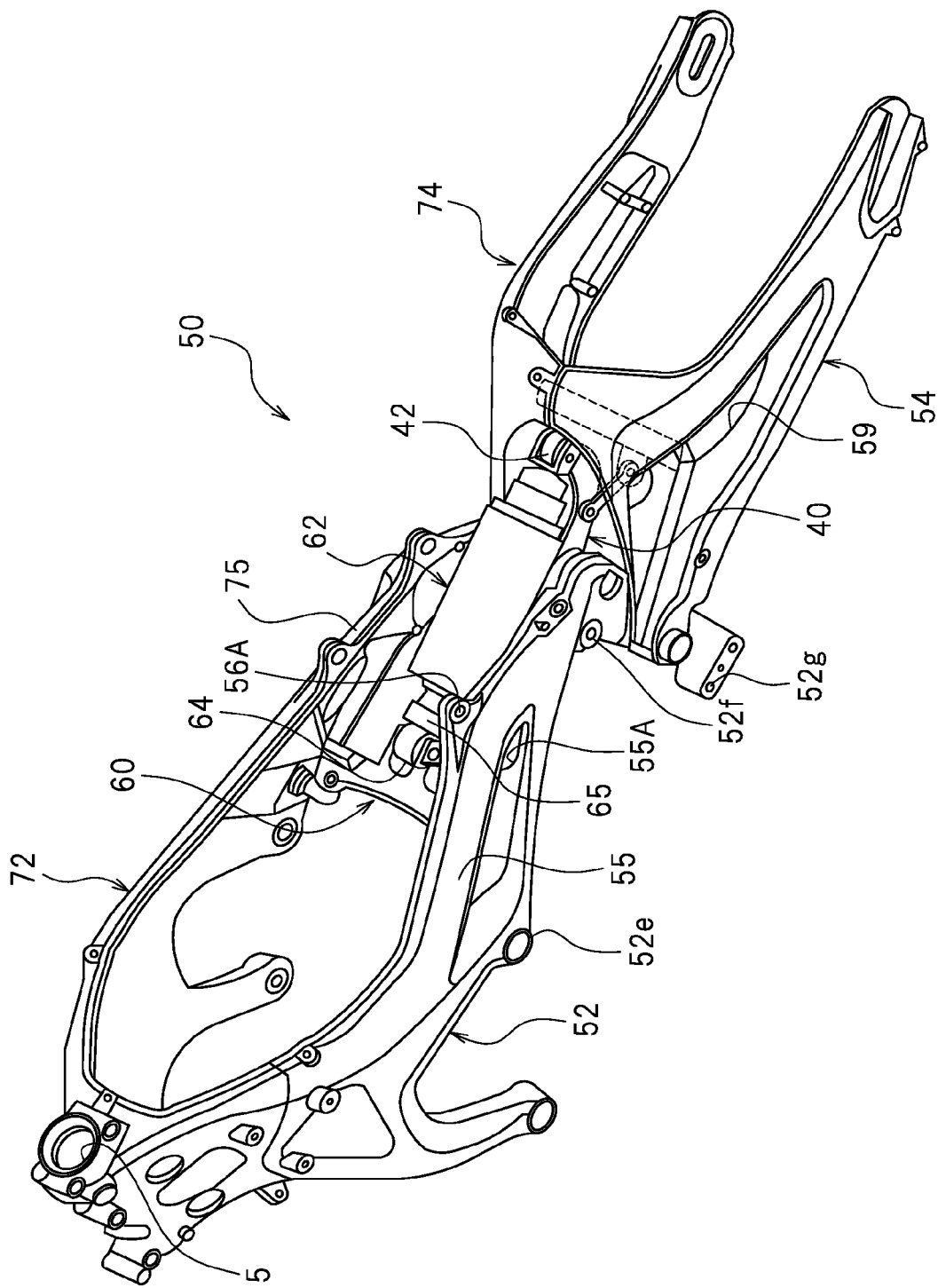
FIG. 7 is a perspective view illustrating the body frame according to a preferred embodiment of the present invention.

As illustrated in FIG. 7, the cross member 60 and the right and left rear arms 74 and 54 are connected to each other through the rear suspension 62. As illustrated in FIG. 4, the rear suspension 62 is disposed on a vehicle center line Z. The rear suspension 62 is located rearward of the front wheel 10 and forward of the rear wheel 12. The rear suspension 62 is at least partially disposed between the left minimum portion 57 and the right minimum portion 77 in the plan view. The rear suspension 62 is at least partially overlapped with the left minimum portion 57 and the right minimum portion 77 in the plan view. As illustrated in FIG. 3, an axis Y of the rear suspension 62 extends substantially in a fore-and-aft direction of the motorcycle 1. As illustrated in FIGS. 1 and 2, an upper end 62A of the rear suspension 62 is located lower than an upper end 80A of the engine 80. A lower end 62B of the rear suspension 62 is located higher than a lower end 80B of the engine 80. The rear suspension 62 is located lower than a straight line X2 extending between an upper end 5A of the head pipe 5 and the center 12A of the rear wheel 12. As illustrated in FIG. 3, the rear suspension 62 is disposed higher than the pivot shaft 51 in the side view. A front end 64 of the rear suspension 62 is overlapped with the through hole 55A of the left inclined portion 55 in the side view. The front end 64 of the rear suspension 62 is provided with an adjustment portion 65 such that a damping force of the rear suspension 62 can be adjusted. The adjustment portion 65 overlaps with the through hole 55A of the left inclined portion 55 in the side view. The adjustment portion 65 preferably includes a screw operated by a screwdriver (not illustrated), for example. It is to be noted that the adjustment portion 65 is not limited to a screw. In other words, the adjustment portion 65 is not limited to any particular component. A device to operate the adjustment portion 65 is not limited to a screwdriver, but may be any other tool, for example. A tool such as a screwdriver is inserted through the through hole 55A of the left inclined portion 55, thus making it possible to operate the adjustment portion 65 without detaching the rear suspension 62.

As used herein, the term "vehicle center line Z" refers to a line that extends in the fore-and-aft direction so as to pass through a lateral (width) center of the front wheel 10 and a lateral (width) center of the rear wheel 12 in the plan view. The expression "the axis Y extends substantially in the fore-and-aft direction" means that an inclination angle θ of the axis Y of the rear suspension 62 with respect to a horizontal direction is smaller than about 30°, for example. The inclination angle θ may be equal to or smaller than about 25°, for example, or may be equal to or smaller than about 20°, for example. The expression "the rear suspension 62 is disposed on the vehicle center line Z" not only means a case where an axial center of a cylinder portion of the rear suspension 62 corresponds to the vehicle center line Z in the plan view of the vehicle, but also means a case where the axial center of the cylinder portion of the rear suspension 62 deviates from the vehicle center line Z in the plan view of the vehicle so long as the rear suspension 62 operates smoothly. The axial center of the cylinder portion of the rear suspension 62 preferably corresponds to the vehicle center line Z in the plan view of the vehicle.

As illustrated in FIG. 4, a link member 40 is interposed between the rear suspension 62 and the right and left rear arms 74 and 54. The link member 40 preferably includes a main body 42, a left connection portion 44, and a right connection portion 45. As illustrated in FIG. 3, the main body 42 is preferably arc-shaped in the side view. The main body 42 is bent so that the main body 42 extends upward as it extends rearward. The main body 42 and the left rear arm 54 are connected to each other through the left connection portion 44. The main body 42 and the right rear arm 74 are connected to each other through the right connection portion 45. The left connection portion 44 is connected to the left rear arm 54 in a swingable manner, and the right connection portion 45 is connected to the right rear arm 74 in a swingable manner.

The main body 42 preferably includes a left front end portion 46, a right front end portion 47, and a rear end portion 48. A front end 43A of the main body 42 and the left main frame 52 are connected to each other in a swingable manner through the left front end portion 46. The front end 43A of the main body 42 and the right main frame 72 are connected to each other in a swingable manner through the right front end portion 47. A rear end 43B of the main body 42 and the rear suspension 62 are connected to each other in a swingable manner through the rear end portion 48. In the present preferred embodiment, the left minimum portion 57 and the front end 43A of the main body 42 are connected to each other through the left front end portion 46, and the right minimum portion 77 and the front end 43A of the main body 42 are connected to each other through the right front end portion 47.

As illustrated in FIG. 5, a sum of a distance A between the left connecting portion 53 and the rear suspension 62 in the vehicle width direction and a distance B between the right connecting portion 73 and the rear suspension 62 in the vehicle width direction is shorter than a width C of the rear suspension 62 in the vehicle width direction.

The engine 80 and the rear wheel 12 are connected to each other so that a driving force generated by the engine 80 is transmitted to the rear wheel 12. The engine 80 preferably includes an output shaft (not illustrated) that outputs the driving force generated by the engine 80. A sprocket (not illustrated) is attached to the output shaft. The sprocket and the rear wheel 12 are connected to each other through a chain 13 that functions as a power transmission member. The driving force generated by the engine 80 is transmitted to the rear wheel 12 via the chain 13. Note that a mechanism which transmits the driving force from the output shaft to the rear wheel 12 is not limited to the chain 13, but may alternatively be a power transmission belt, a drive shaft, a gear mechanism or any other mechanism.

As illustrated in FIG. 1, the left rear arm 54 preferably includes a triangular or substantially triangular through hole 59. The chain 13 preferably includes a first portion 13A, a second portion 13B, and a third portion 13C. The first portion 13A is located below the rear suspension 62. The first portion 13A is located outward of the left rear arm 54. The second portion 13B is located inside the through hole 59. The third portion 13C is located toward a vehicle width center of the rear wheel 12 (see FIG. 4) and inward of the left rear arm 54.

A pair of left and right foot rests 4A and 4B on which the rider's feet are placed are disposed leftward and rightward of the crankcase 82. As illustrated in FIG. 5, the foot rests 4A and 4B are disposed rearward of the left connecting portion 53 and the right connecting portion 73, respectively. As illustrated in FIG. 4, the left minimum portion 57 and the right minimum portion 77 are located between the front end 64 of the rear suspension 62 and the foot rests 4A and 4B.

The motorcycle 1 preferably includes a brake mechanism 35 that brakes rotation of the rear wheel 12. As illustrated in FIG. 2, the brake mechanism 35 preferably includes a brake disc 67, a caliper 38, a master cylinder 68, a reserve tank 36, a brake hose 37 through which the caliper 38 and the master cylinder 68 are connected to each other, and a hydraulic oil pipe 69 through which the master cylinder 68 and the reserve tank 36 are connected to each other. A hydraulic fluid (i.e., oil) is stored in the reserve tank 36, and the hydraulic fluid circulates through the master cylinder 68 and the caliper 38. The rider operates a brake lever (not illustrated), so as to change a pressure of the hydraulic fluid and bringing a brake pad (not illustrated) inside the caliper 38 into contact with the brake disc 67. As a result, rotation of the brake disc 67 is controlled, thus braking the rear wheel 12. As illustrated in FIG. 2, the hydraulic oil pipe 69 is disposed outward of the right minimum portion 77 of the right main frame 72.

As described above, in the motorcycle 1 according to the present preferred embodiment, the rear suspension 62 is disposed so that its axis Y does not extend in a vertical direction but extends substantially in the fore-and-aft direction. Therefore, a vertical height of the rear suspension 62 is reduced, and an increase in the vertical dimension of the motorcycle 1 is prevented. Thus, a height of the seat 20 located above the rear suspension 62 is significantly reduced. Furthermore, in the motorcycle 1 according to the present preferred embodiment, the left connecting portion 53 of the left main frame 52 and the right connecting portion 73 of the right main frame 72 are disposed between the left rear arm 54 and the right rear arm 74. The left main frame 52 is connected to the left rear arm 54 at a position rightward of the left rear arm 54, and the right main frame 72 is connected to the right rear arm 74 at a position leftward of the right rear arm 74. Hence, a distance between the left connecting portion 53 of the left main frame 52 and the right connecting portion 73 of the right main frame 72 in the vehicle width direction can be smaller than a distance between the left rear arm 54 and the right rear arm 74 in the vehicle width direction. The left main frame 52 preferably includes the left minimum portion 57 such that the distance between the left main frame 52 and the right main frame 72 in the vehicle width direction is at a minimum rearward of the left inclined portion 55 and the right inclined portion 75. The right main frame 72 preferably includes the right minimum portion 77 which is located rightward of the left minimum portion 57 such that the distance between the right main frame 72 and the left main frame 52 in the vehicle width direction is at a minimum rearward of the left inclined portion 55 and the right inclined portion 75. The rear suspension 62 is at least partially disposed between the left minimum portion 57 and the right minimum portion 77. Therefore, the seat 20 located above the rear suspension 62 can have a reduced lateral width at the portion of the seat 20 located above the left minimum portion 57 and the right minimum portion 77. Accordingly, the motorcycle 1 provides favorable contact between the rider's foot and the ground and effectively utilizes the space below the rear suspension 62, and also enhances operability of the motorcycle 1. Since the rear suspension 62 is disposed on the vehicle center line Z, a torsional force is prevented from being exerted on the rear suspension 62 itself. Consequently, the rear suspension 62 operates smoothly. Besides, since the rear suspension 62 is disposed on the vehicle center line Z, no torsional load is applied to the cross member 60. As a result, the motorcycle 1 achieves significantly improved vehicle stability.

According to a preferred embodiment of the present invention, the motorcycle 1 preferably includes the link member 40 interposed between the rear suspension 62 and the right and left rear arms 74 and 54. Thus, the rear suspension 62 and the right and left rear arms 74 and 54 is connected to each other in a stable manner.

As illustrated in FIG. 3, the link member 40 preferably includes the left connection portion 44 and the right connection portion 45 (lower connection portions) connected to the left rear arm 54 and the right rear arm 74, respectively, and the rear end portion 48 (upper connection portion) connected to the rear suspension 62. The rear end portion 48 is located above the left connection portion 44 and the right connection portion 45 in the side view. Specifically, the link member 40 is interposed between the rear suspension 62 and the right and left rear arms 74 and 54, so that the connected portion of the rear suspension 62 is located above the connected portions of the right and left rear arms 74 and 54 in the side view. By arranging the link member 40 in this manner, the connected portion of the rear suspension 62 is disposed at a higher position. Hence, the angle θ of the axis Y of the rear suspension 62 with respect to a horizontal line is further reduced.

According to a preferred embodiment of the present invention, the link member 40 preferably includes the main body 42 that is preferably arc-shaped in the side view, the left connection portion 44 through which the main body 42 and the left rear arm 54 are connected to each other, and the right connection portion 45 through which the main body 42 and the right rear arm 74 are connected to each other. The main body 42 preferably includes the left front end portion 46 through which the front end 43A of the main body 42 is connected to the left main frame 52 in a swingable manner, the right front end portion 47 through which the front end 43A of the main body 42 is connected to the right main frame 72 in a swingable manner, and the rear end portion 48 through which the rear end 43B of the main body 42 is connected to the rear suspension 62 in a swingable manner. Thus, it is possible to absorb an impact on the motorcycle 1 from the ground more favorably while using the rear suspension 62 disposed so that its axis Y extends substantially in the fore-and-aft direction.

According to a preferred embodiment of the present invention, the left minimum portion 57 and the right minimum portion 77 are located rearward of the left connecting portion 53 and the right connecting portion 73, respectively. Thus, the seat 20 located above the rear suspension 62 can have a reduced lateral width at the portion of the seat 20 located rearward of the left connecting portion 53 and the right connecting portion 73.

According to a preferred embodiment of the present invention, the left minimum portion 57 and the right minimum portion 77 are located forward of the rear end portion 52A of the left main frame 52 and the rear end portion 72A of the right main frame 72, respectively, and rearward of the front end portion 54B of the left rear arm 54 and the front end portion 74B of the right rear arm 74, respectively. Thus, the seat 20 located above the rear suspension 62 can have a reduced lateral width at the portion of the seat 20 located forward of the rear end portion 52A of the left main frame 52 and the rear end portion 72A of the right main frame 72, and rearward of the front end portion 54B of the left rear arm 54 and the front end portion 74B of the right rear arm 74.

According to a preferred embodiment of the present invention, the sum of the distance A between the left connecting portion 53 and the rear suspension 62 in the vehicle width direction and the distance B between the right connecting portion 73 and the rear suspension 62 in the vehicle width direction is shorter than the width C of the rear suspension 62 in the vehicle width direction. Thus, the distance A between the left connecting portion 53 and the rear suspension 62 and the distance B between the right connecting portion 73 and the rear suspension 62 are each small, and therefore, the seat 20 located above the rear suspension 62 can have a reduced lateral width at the portion of the seat 20 located above the left connecting portion 53 and the right connecting portion 73. The distance between the left minimum portion 57 and the right minimum portion 77 in the vehicle width direction is smaller than the distance between the left connecting portion 53 and the right connecting portion 73 in the vehicle width direction. Hence, the seat 20 located above the rear suspension 62 can have a further reduced lateral width at the portion of the seat 20 located above the left minimum portion 57 and the right minimum portion 77.

According to a preferred embodiment of the present invention, the upper end 62A of the rear suspension 62 is located lower than the upper end 80A of the engine 80, and the lower end 62B of the rear suspension 62 is located higher than the lower end 80B of the engine 80. Thus, an increase in the vertical dimension of the motorcycle 1 can be prevented.

According to a preferred embodiment of the present invention, the motorcycle 1 preferably includes the exhaust pipe 88 connected to the engine 80 and extended rearward, and the silencer 18 connected to the rear end portion of the exhaust pipe 88. The silencer 18 is located lower than the rear suspension 62. Thus, the silencer 18 has a sufficient volume and can be disposed in space that is provided below the rear suspension 62 by disposing the rear suspension 62 substantially horizontally. Since no silencer is disposed outward of the rear wheel 12 of the motorcycle 1, the motorcycle 1 can be reduced in weight and designed to provide an agile appearance (slim appearance).

According to a preferred embodiment of the present invention, the motorcycle 1 preferably includes the rear wheel 12 supported by the rear end portion 54A of the left rear arm 54 and the rear end portion 74A of the right rear arm 74. In the side view, the rear suspension 62 is located lower than the straight line X2 extending between the upper end 5A of the head pipe 5 and the center 12A of the rear wheel 12. Thus, the rear suspension 62 is disposed at a relatively low position on the motorcycle 1. Therefore, even if the vertical height of the rear suspension 62 is increased, the position of the seat 20 can be prevented from being raised. Hence, an increase in the vertical dimension of the motorcycle 1 can be prevented.

According to a preferred embodiment of the present invention, the motorcycle 1 preferably includes the chain 13 which is connected to the engine 80 and the rear wheel 12 and through which the driving force generated by the engine 80 is transmitted to the rear wheel 12. The left rear arm 54 preferably includes the through hole 59. The chain 13 preferably includes the first portion 13A located below the rear suspension 62 and outward of the left rear arm 54, the second portion 13B located inside the through hole 59, and the third portion 13C located inward of the left rear arm 54. Thus, the chain 13 is partially disposed inside the through hole 59 provided in the left rear arm 54, thus making it possible to prevent interference between the left rear arm 54 and the chain 13. In the motorcycle 1, the left rear arm 54 is connected to the left main frame 52 from a position leftward of the left main frame 52. A front portion of the left rear arm 54 is located leftward of the left main frame 52. However, since the left rear arm 54 is provided with the through hole 59, interference between the left rear arm 54 and the chain 13 can be prevented even when the front portion of the left rear arm 54 is located relatively leftward.

According to a preferred embodiment of the present invention, the motorcycle 1 preferably includes the foot rests 4A and 4B on which the rider's feet are placed. The left minimum portion 57 and the right minimum portion 77 are located between the front end 64 of the rear suspension 62 and the foot rests 4A and 4B in the side view. Hence, the seat 20 can have a reduced lateral width at the portion of the seat 20 located rearward of the front end 64 of the rear suspension 62 and forward of the foot rests 4A and 4B in the side view. The rider can place his or her leg at a position laterally of the portion of the seat 20, which has a small lateral width. As a result, more favorable contact is provided between the rider's foot and the ground.

According to a preferred embodiment of the present invention, the motorcycle 1 preferably includes the battery 19 disposed below the seat 20 and above the rear suspension 62. Since the vertical height of the rear suspension 62 is reduced and an increase in the vertical dimension of the motorcycle 1 is prevented, the battery 19 can be disposed below the seat 20 and above the rear suspension 62 in a compact manner.

According to a preferred embodiment of the present invention, the motorcycle 1 preferably includes the hydraulic oil pipe 69 disposed outward of the right minimum portion 77. Thus, space provided outward of the right minimum portion 77 is utilized, thus making it possible to arrange the hydraulic oil pipe 69 in a compact manner. Since the hydraulic oil pipe 69 does not protrude outward in the vehicle width direction, the motorcycle 1 can be reduced in lateral width.

According to a preferred embodiment of the present invention, the motorcycle 1 preferably includes the left seat frame 56 that extends obliquely upward and rearward from the left main frame 52, and the right seat frame 76 that extends obliquely upward and rearward from the right main frame 72. The left main frame 52 preferably includes the left connection portion 56A connected to the left seat frame 56. The right main frame 72 preferably includes the right connection portion 76A connected to the right seat frame 76. The left main frame 52 and the left rear arm 54 are configured so that in the left side view, the left connection portion 56A is disposed lower than the straight line X3 extending between the upper end 52t of the left main frame 52 and the upper end 54t of the left rear arm 54. The right main frame 72 and the right rear arm 74 are configured so that in the right side view, the right connection portion 76A is disposed lower than the straight line X4 extending between the upper end 72t of the right main frame 72 and the upper end 74t of the right rear arm 74. Since the left connection portion 56A is disposed lower than the straight line X3 extending between the upper end 52t of the left main frame 52 and the upper end 54t of the left rear arm 54, the left connection portion 56A connected to the left seat frame 56 can be set at a low height. Furthermore, since the right connection portion 76A is disposed lower than the straight line X4 extending between the upper end 72t of the right main frame 72 and the upper end 74t of the right rear arm 74, the right connection portion 76A connected to the right seat frame 76 can be set at a low height. As a result, the seat 20 can be set at a low height.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A motorcycle comprising:
   a head pipe;
   a body frame including a left main frame that extends obliquely downward and rearward from the head pipe, a right main frame that extends obliquely downward and rearward from the head pipe and is located rightward of the left main frame, a left rear arm connected to the left main frame, a right rear arm connected to the right main frame, and a cross member that extends between the left main frame and the right main frame;
   an engine disposed below the left main frame and the right main frame;
   a rear suspension disposed on a vehicle center line so that an axis of the rear suspension extends substantially in a fore-and-aft direction and through which the cross member, the right rear arm, and the left rear arm are connected to each other; and
   a seat supported by the body frame and at least partially located above the rear suspension; wherein
   the left main frame includes:
      a left connecting portion disposed between the left rear arm and the right rear arm and connected to the left rear arm;
      a left inclined portion located at least partially rearward of the cross member and extended obliquely rightward and rearward; and
      a left minimum portion located rearward of the left inclined portion;
   the right main frame includes:
      a right connecting portion disposed between the left rear arm and the right rear arm and connected to the right rear arm;
      a right inclined portion located at least partially rearward of the cross member and extended obliquely leftward and rearward; and
      a right minimum portion located rearward of the right inclined portion and rightward of the left minimum portion such that a distance between the left minimum portion and the right minimum portion in a vehicle width direction is a minimum distance between the left main frame and the right main frame rearward of the left inclined portion and the right inclined portion; and
   the rear suspension is at least partially disposed between the left minimum portion and the right minimum portion in a plan view of the motorcycle.

2. The motorcycle according to claim 1, further comprising a link member interposed between the rear suspension and the right and left rear arms.

3. The motorcycle according to claim 2, wherein the link member includes lower connection portions connected to the left rear arm and the right rear arm, and an upper connection portion located above the lower connection portions in a side view of the motorcycle and connected to the rear suspension.

4. The motorcycle according to claim 2, wherein the link member includes a main body that is arc-shaped in a side view of the motorcycle, a left connection portion through which the main body and the left rear arm are connected to each other, and a right connection portion through which the main body and the right rear arm are connected to each other; and the main body includes a left front end portion connected to the left main frame in a swingable manner, a right front end portion connected to the right main frame in a swingable manner, and a rear end portion connected to the rear suspension in a swingable manner.

5. The motorcycle according to claim 1, wherein the left minimum portion and the right minimum portion are located rearward of the left connecting portion and the right connecting portion, respectively.

6. The motorcycle according to of claim 1, wherein the left minimum portion and the right minimum portion are located forward of a rear end portion of the left main frame and a rear end portion of the right main frame, respectively, and rearward of a front end portion of the left rear arm and a front end portion of the right rear arm, respectively.

7. The motorcycle according to claim 1, wherein a sum of a distance between the left connecting portion and the rear suspension in the vehicle width direction and a distance between the right connecting portion and the rear suspension in the vehicle width direction is shorter than a width of the rear suspension in the vehicle width direction.

8. The motorcycle according to claim 1, wherein an upper end of the rear suspension is located lower than an upper end of the engine, and a lower end of the rear suspension is located higher than a lower end of the engine.

9. The motorcycle according to claim 1, further comprising an exhaust pipe connected to the engine and at least partially extended rearward, and a silencer connected to a rear end portion of the exhaust pipe, wherein the silencer is located lower than the rear suspension.

10. The motorcycle according to claim 1, further comprising a rear wheel supported by a rear end portion of the left rear arm and a rear end portion of the right rear arm, wherein the rear suspension is located lower than a straight line extending between an upper end of the head pipe and a center of the rear wheel in a side view of the motorcycle.

11. The motorcycle according to claim 1, further comprising a rear wheel supported by a rear end portion of the left rear arm and a rear end portion of the right rear arm, and a power transmission member connected to the engine and the rear wheel and through which a driving force generated by the engine is transmitted to the rear wheel, wherein either the left rear arm or the right rear arm is provided with a through hole, and the power transmission member includes a first portion located below the rear suspension and outward of the rear arm provided with the through hole, a second portion located inside the through hole, and a third portion located inward of the rear arm provided with the through hole.

12. The motorcycle according to claim 1, further comprising a foot rest on which a rider's is placed, the foot rest being disposed below the seat and rearward of a front end of the rear suspension in a side view of the motorcycle, wherein the left minimum portion and the right minimum portion are located between the front end of the rear suspension and the foot rest in the side view.

13. The motorcycle according to claim 1, further comprising a battery disposed below the seat and above the rear suspension.

14. The motorcycle according to claim 1, further comprising a hydraulic oil pipe disposed outward of either the left minimum portion or the right minimum portion.

15. The motorcycle according to claim 1, further comprising:

a left seat frame that extends obliquely upward and rearward from the left main frame; and a right seat frame that extends obliquely upward and rearward from the right main frame; wherein the left main frame includes a left connection portion connected to the left seat frame;

the right main frame includes a right connection portion connected to the right seat frame; and the left main frame and the left rear arm are configured so that in a left side view of the motorcycle, the left connection portion is disposed on or below a straight line extending between an upper end of the left main frame and an upper end of the left rear arm, and/or the right main frame and the right rear arm are configured so that in a right side view of the motorcycle, the right connection portion is disposed on or below a straight line extending between an upper end of the right main frame and an upper end of the right rear arm.

* * * * *